United States Patent [19]

Gerling

[11] Patent Number: 4,815,865
[45] Date of Patent: Mar. 28, 1989

[54] HYDRODYNAMIC PLAIN RADIAL BEARING

[75] Inventor: Paul Gerling, Oberhausen, Fed. Rep. of Germany

[73] Assignee: Braunschweiger Huttenwerk GmbH, Brunswick, Fed. Rep. of Germany

[21] Appl. No.: 137,019
[22] PCT Filed: Apr. 28, 1987
[86] PCT No.: PCT/DE87/00187
  § 371 Date: Nov. 13, 1987
  § 102(e) Date: Nov. 13, 1987
[87] PCT Pub. No.: WO87/07341
  PCT Pub. Date: Dec. 3, 1987

[30] Foreign Application Priority Data

May 23, 1986 [DE] Fed. Rep. of Germany ....... 3617289

[51] Int. Cl.⁴ ..................... F16C 17/03; F16C 33/10
[52] U.S. Cl. .................................. 384/117; 384/309
[58] Field of Search ............................ 384/309–312, 384/117–119, 114, 100, 99

[56] References Cited

U.S. PATENT DOCUMENTS

| | | | |
|---|---|---|---|
| 3,023,055 | 2/1962 | Thompson | 384/117 |
| 3,351,394 | 11/1967 | Hooker . | |
| 3,589,782 | 6/1971 | Le Breton . | |
| 3,905,250 | 9/1975 | Sigg . | |
| 4,568,204 | 2/1986 | Chambers | 384/309 X |
| 4,580,911 | 4/1986 | Burkhard et al. | 384/309 |
| 4,636,095 | 1/1987 | Gerling | 384/117 |

FOREIGN PATENT DOCUMENTS

| | | |
|---|---|---|
| 3414910 | 10/1985 | Fed. Rep. of Germany . |
| 1450715 | 8/1966 | France . |
| 1492819 | 8/1967 | France . |
| 1506849 | 12/1967 | France . |

Primary Examiner—Stuart S. Levy
Assistant Examiner—Thomas R. Hannon
Attorney, Agent, or Firm—Herbert Dubno

[57] ABSTRACT

The bearing described comprises a bearing housing (1); a cylindrical outer race (2) for pivoting segments; pivoting segments inserted into said outer race and distributed around its circumference; and a lubricant feed system (4). The pivoting segments (3) have, on the shaft side, a sliding surface (5) with a transverse groove (6) for the lubricant supply on the stage of its sliding surface (5) which is opposed to the direction of movement of the shaft and one the other side a rocking surface (8), the radial cross-section of which corresponds to the sector of the circle having a radius which is smaller than the radius of the cylindrical outer race of the pivoting segments. Furthermore, the pivoting segments form, on both sides of the rocking surface (8) a gap (10, 11) in relation to the cylindrical outer race (2), the gap (10, 11) tapering off in a manner which matches that of the rocking surface (8). These gaps (10, 11) have, at least in the region which tapers off in the opposite direction to the rotation of the shaft and formed by the rocking surface (8), a damping gap region, which is formed on one hand by a surface region of the cylindrical recess (2) of the tilting segments, and on the other hand by a reverse surface region (12), which is concentric to it, of the the pivoting segment (3). The lubricant supply system (4) comprises a segmented channel (13) leading from the transverse lubricant supply groove (6), obliquely to the rocking surface (8) and ending in a lubricant supply aperture (9) arranged in the cylindrical outer race (2) of the pivoting segments.

5 Claims, 2 Drawing Sheets

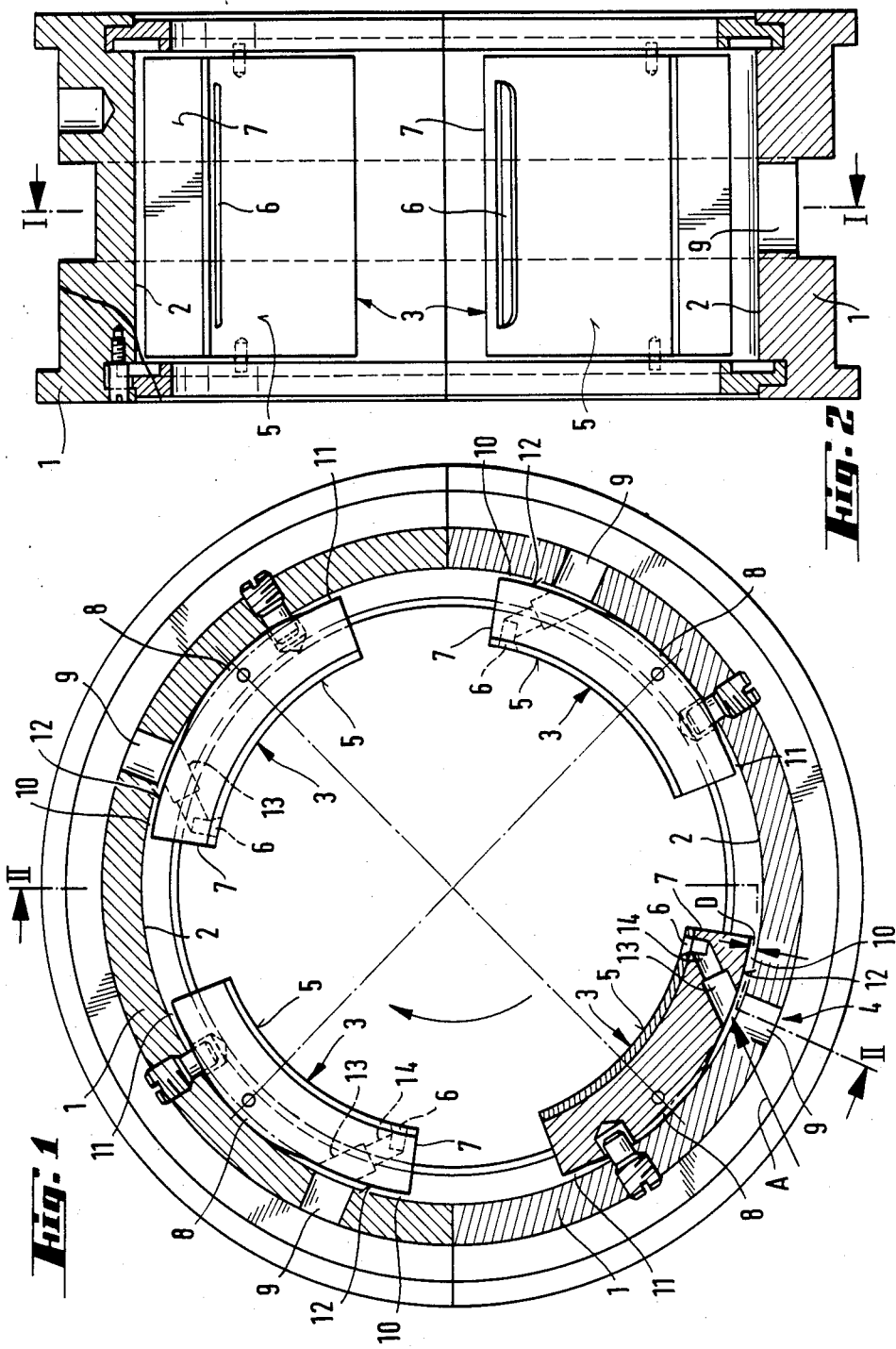

HYDRODYNAMIC PLAIN RADIAL BEARING

BACKGROUND OF THE INVENTION

Generically, the invention covers a hydrodynamic radial-sliding bearing with a bearing housing, a cylindricl outer race for pivoting segments; pivoting segments inserted into the race which are distributed over the race circumference; and a means of lubricant supply with lubricant supply apertures in the outer race for pivoting segments. The pivoting segments exhibit on the shaft side a sliding surface with transverse lubricant supply groove on the edge of it sliding surface opposite the direction of shaft rotation. On the backside of the pivoting segments is a rocking surface, whose radial cross-section corresponds to a circular sector having a radius smaller than the radius of the outer race for the pivoting segments. Furthermore, the pivoting segments form to either side of the rocking surface, a gap which, in accordance with the rocking surface, i.e. in a radially outwards oriented projection underneath the rocking surface, may extend over the full width of the pivoting segments or may be provided only in a limited way, e.g. in the central portion of the width of the pivoting segments. Such radial-sliding bearing must, on the one hand, handle the dynamics of the shaft or the dynamics of a rotor connected to the shaft and, on the other hand, must operate with low losses. Included in the shaft dynamics are the vibration amplitudes of the shaft and/or the rotor resulting from bending vibrations and critical speeds.

It is the object of the invention to dampen the aforementioned vibrations. Losses arise not only from lubricant friction in the sliding gaps formed by the sliding surfaces of the pivoting segments when contacting the shaft surface, but also arise in the interstices of the pivoting segments.

Commercially known bearings have gaps in the back of the pivoting segments which are wedge-shaped over their entire length.

The lubricant supply channels run more or less radially in the pivoting segments and are in the area of the segment support. From there the lubricant is fed to the lubricating gaps. As a consequence of this arrangement, when the radial-sliding bearing is running lubricant exits from the gap areas. Thus the lubricant can hardly contribute in the gap areas to the damping of the abovementioned vibrations. Unfortunately damping normally occurs practically exclusively in the lubricant layer. There is thus an evident need for improvement in radial-sliding bearings in general. The lubricant moves into the gaps of the pivoting segments and due to turbulence and internal friction caused thereby it contributes to a considerable extent in both power losses and loss of oil.

It is the objective of the invention to develop a radial-sliding bearing so that without additional components a very noticeable attenuation of the described vibration takes place and power losses as well as loss of oil are reduced.

SUMMARY OF THE INVENTION

In accordance with this objective, the invention proposes that the gap of the pivoting segments include a damping region in the form of an extension at least in the wedge-shaped spaces formed in areas opposite the direction of shaft rotation by the rocking surface. This extension should be formed by the cylindrical area of the outer race for the pivoting segments on the one hand, and by a reverse surface region of the pivoting segment concentric therewith. The lubricant supply system should comprise a segmented channel leading obliquely from the transverse lubricant supply groove to the rocking surface and the corresponding lubricant supply aperture positioned therein.

The invention is based on the concept that the gap below the pivoting segments can contribute considerably to the reduction of power loss and loss of oil, as well as to vibration damping if the gap includes areas outside the wedge shape and having a small gap thickness. This is achieved by creating damping gap regions formed by a surface area of the cylindrical outer race for pivoting segments on the one hand, and by a reverse surface region of the pivoting segment on the other hand, concentric therewith but not pivoted upon. Additionally, care must be taken that this damping gap region is sufficiently long. Accordingly, the means of supplying lubricant should comprise the obliquely positioned lubricant channels described, so that no lubricant can enter into the interstices of the pivoting segments. It is understood that the thickness of the damping gap regions and their length must be adapted to special conditions, where the degree of freedom of pivoting segments must be considered. Thickness of the damping gap regions should be held as small as possible, but extend the damping gap spaces as far as possible in circumferential direction.

A preferred embodiment of the invention with damping gaps on both sides of the wedge-shaped areas formed by the rocking surface of the pivoting segments is characterized by the damping gaps arrayed opposite the direction of shaft rotation being several times longer than the gap in the direction of shaft rotation. This arrangement is effective because the former gap can contribute more to the damping of the described vibration than the gap lying in the direction of shaft rotation. In the case of a radial-sliding bearing with a radius from 5 to 10 cm, it is recommended that the damping gap spaces with the pivoting segments not pivoted, be constructed as parallel gaps and exhibit a gap thickness which amounts maximally to 2%, preferably less than 1%, of the radius of the sliding surface of the pivoting segments. In order to have a sufficient lubricant supply for the radial-sliding bearings, the invention proposes that the segmented channel exhibit a slit-shaped cross section extending over the width of the pivoting segments and open into a multiplicity of lubricant exit bores which connect to the lubricant transverse supply groove, and that the lubricant supply aperture be adapted to the cross section of the segmented channel.

Hydrodynamic radial-sliding bearings of the design described have their pivoting segments subjected to considerable mechanical stress. Included are also bending moments in a bending moment axis more or less coincident with the axis of the radial-sliding bearing. Nevertheless to assure that the radial-sliding bearing operates in the afore defined manner with respect to the damping gap and lubricant layer on the sliding surfaces, it is a preferred embodiment of the invention that the rocking surface and the pivoting segment are of unitary contruction. The pivoting segments so constructed have a very great moment of resistance against mechanical stresses and thus a corresponding stiffness against bending. Furthermore, unitary conttstruction eliminates the necessity for costly additional construction elements. Thus, particularly small bearings with direct lubricant transfer can be realized. Where there are less mechanical stresses, the rocking surface can be realized as a separate component inserted into a mating recess in back of the pivoting segments.

Advantages of the radial-sliding bearing according to the invention include achievement of a very distinct damping of vibrations because damping takes place not only in the lubricant layer over the sliding surface, but also in the gap under the pivoting segments, which are shaped accordingly.

In addition, with this shaping of the gap as a damping gap region, the exit of lubricant through the damping gap is reduced. The amount of oil which gathers in the interstices of the pivoting segments is therefore comparatively small and practically eliminates oil losses from this source. Overall losses of oil and of power are thereby reduced. It is to be understood that the bearing end is open frontally, so that the lubricant can drain away as usual. The herein described improvements do not adversely effect the requirement for good pivoting mobility of the pivoting segments or the small gap height in the area of oil transfer from the bearing housing to the pivoting segments.

BRIEF DESCRIPTION OF THE DRAWING

The above and other objectives, features and advantages of the invention will become more readily apparent from the following description, reference being made to the accompanying drawing in which:

FIG. 1 is a section orthogonal to the axis of a radial-sliding bearing according to the invention;

FIG. 2 is a cross section through the embodiment of FIG. 1;

SPECIFIC DESCRIPTION

Figure 3:
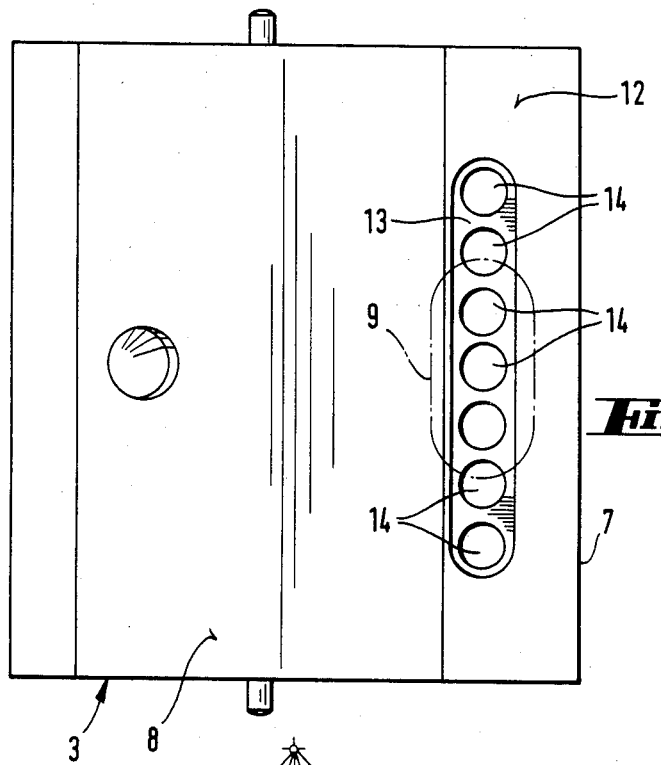
FIG. 3 is a partial view of the pivoting segment of the embodiment according to FIG. 1 in direction of arrows A.

The basic construction of the radial-sliding bearing shown in FIGS. 1 to 3 consists of a bearing housing 1, a cylindrical outer race 2 for pivoting segments, a multiplicity of pivoting segments 3 inserted into the outer race which are distributed over the race circumference, and a means of lubricant supply 4.

Figure 4:
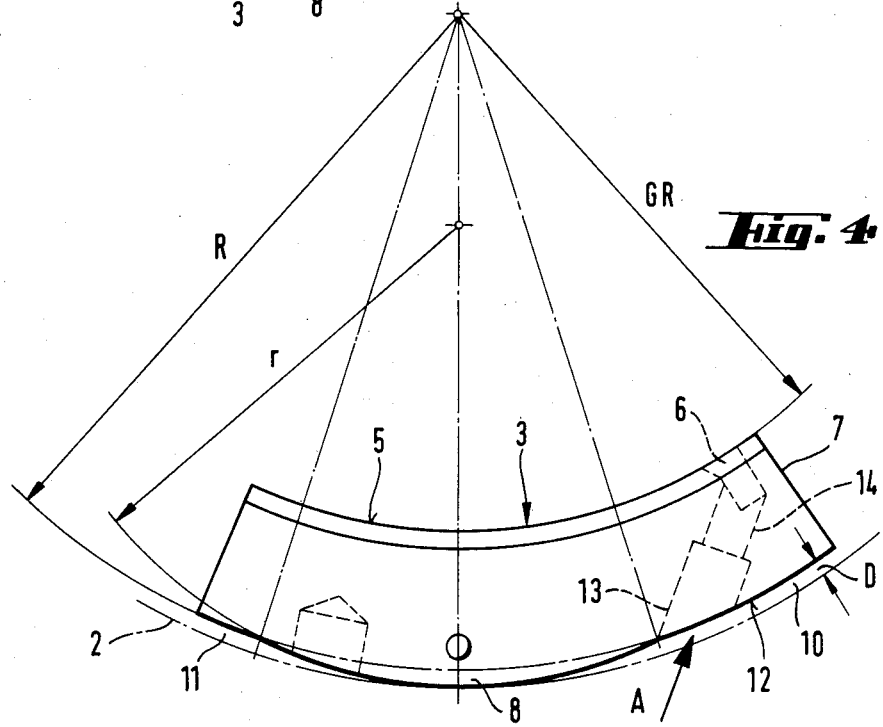
FIG. 4 is in a scale substantially enlarged with respect to FIGS. 1 to 3, a view of an oscillating segment of a radial-sliding bearing according to the invention.

Pivoting segments 3 have, facing the shaft, a sliding surface 5 with transverse lubricant supply groove 6 on that edge 7 of the sliding surface 5 opposed to the movement direction of shaft rotation and on the other side a rocking surface 8. As recognizable particularly from FIG. 1, one lubricant supply aperture 9 is coordinated to each transverse lubricant supply groove 6. The radial section of rocking surface 8 corresponds to a sector of a circle with a radius r reduced with respect to the radius R of the cylindrical outer race for pivoting segments 2. See also FIG. 4. As a result of this arrangement, the pivoting segments 3 form to either side of rocking surface 8 a gap 10, 11 opposite the cylindrical outer race. Gap 10, 11 in conformance with rocking surface 8 in an outwardly directed radial projection becomes narrower in the shape of a wedge. Comparison of FIGS. 1 and 4 shows gap 10, 11 of the pivoting segments 3 comprises an extension or damping gap region 10 at least in the wedge-shaped spaces opposite the movement direction of shaft rotation formed by the rocking surface 8. This damping gap 10 is on the one hand formed by a surface area of the cylindrical outer race for pivoting segments 2 and, on the other hand, by a reverse surface region 12 concentric therewith of a pivoting segment 3 considered for this purpose as not pivoted. In order to have the lubricant flow path in the damping gaps 10 as long as possible, provision is made, as shown in FIG. 1, of a lubricant supply system 4. This system comprises a segmented channel 13 leading from the transverse lubricant supply groove 6 obliquely to the rocking surface 8 and to a coordinated lubricant supply aperture 9 in the cylindrical outer race for pivoting segments 2. FIG. 1 shows the damping gap 10 opposed to the direction of shaft rotation is several times longer than the gap 11 lying in the direction of rotation. For reasons of clarity, damping gaps 10, 11 are shown in the Figures in an exaggerated manner. Under actual practice, the arrangement has the damping gaps 10, 11, as seen with pivoting segments 3 not pivoted, forming a maximum gap width D amounting to about 2% of the radius GR of the sliding surface of the pivoting segments 3.

Lubricant supply for the described radial-sliding bearing is assured by the segmented channel 13 which exhibits a slit-shaped cross section extending over the width of the pivoting segments 3 and opening into a multiplicity of lubricant exit apertures 14. See in particular FIG. 3. The lubricant exit apertures 14 open into the lubricant supply transverse groove 6. It is understood that the lubricant supply aperture 9 is adapted to the cross section of segmented channel 13.

For the illustrated embodiment, the pivoting segments 3 have a very high moment of resistance. Thus, they are rendered stiff against bending. This is achieved by having the rocking surfaces 8 and the pivoting segment 3 as a single element of construction.

I claim:

1. A hydrodynamic radial-sliding bearing comprising: a bearing housing;
a cylindrical outer race having a circumference surrounding a shaft;
pivoting segments arrayed in said outer race and distributed around said circumference, said segments having on a shaft side a sliding surface opposed to a direction of movement of the shaft, said segments having on a reverse side a rocking surface with a radial cross-section corresponding to a sector of a circle having a radius smaller than a radius of said cylindrical outer race, said rocking surface having sides tapering into a wedge structure,
means for supplying lubricant including lubricant supply apertures formed in said outer race, a transverse lubricant supply groove in said segment, a segmented channel leading from said transverse groove obliquely to said rocking surface and from there into a corresponding one of said lubricant supply apertures in said outer race; and
a damping gap formed between said rocking surface and said cylindrical outer race in a wedge shaped region opposite the direction of shaft rotation movement.

2. A bearing according to claim 1 wherein the damping gap is several times longer than a gap region of said pivoting segment formed between said rocking surface and said cylindrical outer race lying in the movement direction of the shaft.

3. A bearing according to claim 1 wherein the damping gap has a gap width which is at most 2% of a sliding surface radius of the pivoting segment.

4. A bearing according to claim 1 wherein the segmented channel has a slit-shaped cross section extending over a width of the pivoting segment and continues into a multiplicity of lubricant exit apertures connecting to said lubricant supply transverse groove, and said lubricant supply apertures being adapted to a cross section of said segmented channel.

5. A bearing according to claim 1 wherein said rocking surface and said pivoting segments and surfaces are constructed as a unitary element.

* * * * *